July 31, 1923.

B. J. DUEHR

ANTISKID CHAIN

Filed Feb. 13, 1923

1,463,681

Inventor
Bernard J. Duehr.

By

Attorney

Patented July 31, 1923.

1,463,681

UNITED STATES PATENT OFFICE.

BERNARD J. DUEHR, OF BIG ISLAND, VIRGINIA.

ANTISKID CHAIN.

Application filed February 13, 1923. Serial No. 618,773.

*To all whom it may concern:*

Be it known that I, BERNARD J. DUEHR, a citizen of the United States, residing at Big Island, in the county of Bedford, State of Virginia, have invented certain new and useful Improvements in Antiskid Chains; and I do hereby declare the following to be a full, clear, and exact description of the invention, such as will enable others skilled in the art to which it appertains to make and use the same.

This invention relates to new and useful improvements in anti-skidding devices, and particularly to devices used on rubber tired wheels, to prevent the wheels slipping on ice, snow, or wet pavements.

One object of the invention is to provide a device of this character which is simple in construction, formed from few parts, and which can be easily and quickly manipulated onto or from the wheel.

Another object is to provide a device of this character which is firmly mounted on the wheel and which cannot be easily displaced and lost.

Other objects and advantages will be apparent from the following description when taken in connection with the accompanying drawing.

Figure 1:
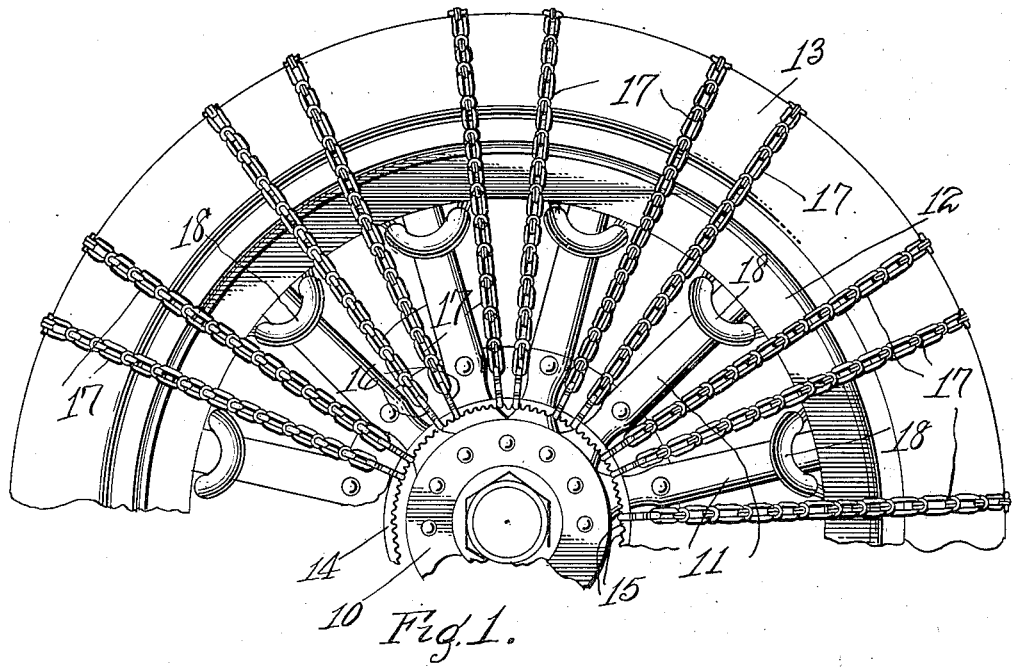
Figure 1 is an elevation of a portion of a wheel showing the invention applied thereto.
Figure 2:
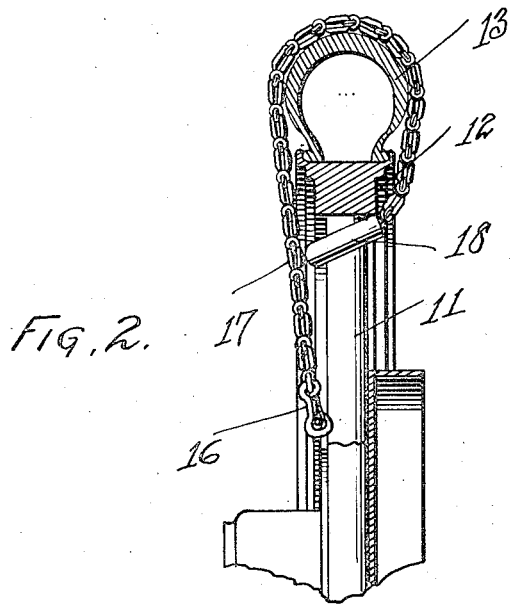
Figure 2 is an enlarged vertical sectional view taken through the rim and tire, between two spokes and showing the invention in elevation.

Referring particularly to the accompanying drawing, 10 represents the hub, 11 the spokes, 12 the rim, and 13 the tire, of a wheel, in connection with which the present invention is adapted for use.

Disposed around the outer end of the hub 10, but spaced therefrom, is a ring 14, having a plurality of corrugations 15 on its inner face, said corrugations extending transversely of the ring, as seen in the sectional view. Engaged with the ring are the snap ends of the snap-hooks 16, which snap-hooks are fixed on the ends of the chains 17. The intermediate portion of each of the chains 17 is engaged around the portion of a spoke adjacent the rim, with the side portions of the chain passed over the tire, and inwardly to the ring 14. To prevent chafing of the rim and spokes, each of the chains has a short length of rubber or like tubing 18 engaged on the intermediate portion thereof.

In applying the chain to the wheel, the snap end of one hook 16 is engaged with the ring 14, and the ring placed around the hub, after which the chain is passed over the tire, around the spoke, and back around the tire, as shown in the drawing, and thence back to the ring, where the other hook member 16 has its snap end engaged with the ring.

It will be understood that, in the preferred use of this device, there is provided a chain for each spoke, but in some instances it is desired to use less chains than shown, especially when a wheel is stuck in mud, and requires some traction to reach firm ground, which is only a matter of a foot or two. In this case the number of chains used may be reduced, according to the distance the wheel must travel to reach firm ground. Again, a chain for each alternate spoke may be used, as the conditions require. With this construction, danger of displacement or loss is obviated.

What is claimed is:

1. An anti-skid device including a plurality of flexible elements arranged to be engaged with the tire and spokes of a wheel and provided with terminal attaching means, and a hub encircling ring with which the said attaching means are detachably engaged.

2. An anti-skid device including a plurality of flexible elements arranged to have their intermediate portions engaged with the tire and spokes of a wheel, a ring disposed in encircling relation to the hub of a wheel, and means on the ends of the flexible elements arranged for engagement with the ring.

3. An anti-skid device including a plurality of flexible elements having their intermediate portions arranged for engagement across the tire and around the spokes of a wheel, hook members on the ends of the flexible elements, and a ring disposed in encircling relation to the hub of the wheel and having transverse corrugations on its inner face for detachable retention of the said hook members.

In testimony whereof, I affix my signature in the presence of two witnesses.

BERNARD J. DUEHR.

Witnesses:
A. P. TALLEY,
WATSON BURKS.